US011543231B2

(12) United States Patent
Ausserlechner

(10) Patent No.: US 11,543,231 B2
(45) Date of Patent: Jan. 3, 2023

(54) INDUCTIVE ANGLE SENSOR WITH CLEARANCE VALUE ASCERTAINMENT

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 92 days.

(21) Appl. No.: 16/949,825

(22) Filed: Nov. 16, 2020

(65) Prior Publication Data

US 2021/0156665 A1 May 27, 2021

(30) Foreign Application Priority Data

Nov. 27, 2019 (DE) ............... 102019218399.9

(51) Int. Cl.
*G01R 31/34* (2020.01)
*G01B 7/14* (2006.01)
(Continued)

(52) U.S. Cl.
CPC ............... *G01B 7/30* (2013.01); *G01D 5/204* (2013.01); *G01D 18/00* (2013.01)

(58) Field of Classification Search
CPC .......... G01D 18/00; G01D 5/204; G01B 7/30
See application file for complete search history.

(56) References Cited

U.S. PATENT DOCUMENTS 6,236,199 B1 * 5/2001 Irle ..................... G01D 5/2093
324/207.17
6,504,361 B1 1/2003 Gleixner
(Continued)

FOREIGN PATENT DOCUMENTS

CN 1285036 A 2/2001
CN 101122472 A 2/2008
(Continued)

OTHER PUBLICATIONS

Chen et al., "Study on the Electromagnetic Fields of a Novel Small-angle Transducer Used in High-precision Inertial Sensors." Sensor Review, 2019, vol. 39(5), pp. 697-703.
(Continued)

*Primary Examiner* — Alesa Allgood
(74) *Attorney, Agent, or Firm* — Harrity & Harrity, LLP

(57) ABSTRACT

An inductive angle sensor is provided with a stator with an excitation oscillating circuit and a pickup coil arrangement and also with a rotor which is arranged rotatably with respect to the stator and comprises an inductive target arrangement. The excitation oscillating circuit can be energizable with an alternating current, in order to induce an induction current in the target arrangement, and the target arrangement can be designed to generate a magnetic field in reaction to the induction current, which magnetic field in turn generates induction signals in the pickup coil arrangement. The angle sensor further comprises a circuit that is designed to derive an induction strength signal representing the signal strength of the induction signals from the induction signals and to ascertain the spatial clearance between the rotor and the stator on the basis of the induction strength signal, and to generate a corresponding clearance signal.

15 Claims, 9 Drawing Sheets

(51) Int. Cl.
*G01B 7/30* (2006.01)
*G01D 5/20* (2006.01)
*G01D 18/00* (2006.01)

(56) References Cited

U.S. PATENT DOCUMENTS

| | | | |
|---|---|---|---|
| 10,989,516 B2 | 4/2021 | Ausserlechner | |
| 2014/0246939 A1* | 9/2014 | Murakami | H02K 1/278 310/156.05 |
| 2015/0022188 A1 | 1/2015 | Daubert et al. | |
| 2018/0224301 A1 | 8/2018 | Herrmann et al. | |
| 2019/0011285 A1 | 1/2019 | Utermoehlen et al. | |
| 2019/0265018 A1 | 8/2019 | Latham et al. | |

FOREIGN PATENT DOCUMENTS

| | | |
|---|---|---|
| CN | 104969038 A | 10/2015 |
| CN | 106441081 A | 2/2017 |
| CN | 106996738 A | 8/2017 |
| CN | 108351224 A | 7/2018 |
| CN | 108574430 A | 9/2018 |
| CN | 109211099 A | 1/2019 |
| CN | 109990697 A | 7/2019 |
| DE | 10105122 A1 | 8/2002 |
| DE | 102004027954 A1 | 12/2005 |
| DE | 102013212268 A1 | 12/2014 |
| DE | 102015220650 A1 | 4/2017 |
| EP | 0909955 B1 | 9/2009 |
| JP | 2000105133 A | 4/2000 |
| JP | 2008122279 A | 5/2008 |
| WO | 2014091032 A2 | 6/2014 |

OTHER PUBLICATIONS

Liu et al., "Research on Electromagnetic Induction Position Sensor," Sensors and Microsystems, 2017, vol. 36(4).

Zhao et al., "Research on a New Hall Angle Sensor," Acta Metrologica Sinica, 2018, vol. 39(6), pp. 797-800.

* cited by examiner

INDUCTIVE ANGLE SENSOR WITH CLEARANCE VALUE ASCERTAINMENT

CROSS REFERENCE TO RELATED APPLICATION

This application claims priority to German Patent Application No. 102019218399.9 filed on Nov. 27, 2019, the content of which is incorporated by reference herein in its entirety.

TECHNICAL FIELD

The present disclosure relates to an inductive angle sensor for ascertaining a rotation angle between a stator and a rotor.

BRIEF SUMMARY

Some example implementations may envisage that the inductive angle sensor for determining the rotation angle uses a calibrated rotation angle signal that has been ascertained taking the spatial clearance between the rotor and the stator into consideration. Further example implementations relate to a corresponding method for determining the rotation angle between the stator and the rotor on the basis of the calibrated rotation angle signal. Further example implementations relate to a computer program with a program code for carrying out this method.

Inductive angle sensors use inductances as well as induced eddy currents and corresponding magnetic fields. Their structure thus differs from classic magnetic field sensors such as for example Hall sensors or magnetoresistive (MR) sensors such as for example the AMR sensors (AMR: anisotropic magnetoresistive), TMR sensors (TMR: tunnel magnetoresistive) or GMR sensors (GMR: giant magnetoresistive).

Inductive angle sensors usually comprise an excitation oscillating circuit as well as an inductive target and a receiving coil that can also be referred to as the pickup coil. The excitation oscillating circuit can be energized with an alternating voltage or an alternating current, whereby the excitation oscillating circuit generates a magnetic field which in turn induces an induction current in the target. This induction current in the target in turn has the effect that a corresponding magnetic field develops that generates an induction signal, for example an induction current or an induction voltage, in the pickup coil.

The target and the pickup coil are arranged in such a way relative to one another that they lie opposite one another. The induction signal received by the pickup coil depends inter alia on the angle-specific position or positioning of the target with respect to the pickup coil, e.g. the signal strength of the induction signal changes depending on the angle-specific position of the target relative to the pickup coil. The rotation angle of the target relative to the pickup coil can be determined through this.

The inductive angle sensors do not operate accurately enough for some applications. One of the reasons for this is that the accuracy of the induction signal depends on a large number of factors such as for example the quality of the excitation oscillating circuit, the number and geometry of the coils used, or the spatial clearances between the individual coils.

Raising the quality of the oscillating circuit, like raising the number of components in the element, entails higher costs, and the spatial clearances between the individual sensor components are usually fixedly specified by the construction technology used, or can only be varied within narrow limits.

Implementations described herein may improve existing inductive angle sensors in that they deliver precise signals and are nevertheless economical to manufacture.

For example, the angle sensor comprises a stator with an excitation oscillating circuit and a pickup coil arrangement and also a rotor which is arranged rotatably with respect to the stator with an inductive target arrangement. The excitation oscillating circuit can be energized with an alternating current, in order to induce an induction current in the target arrangement. The target arrangement is, in turn, designed to generate a magnetic field in reaction to this induction current, which magnetic field in turn generates induction signals in the pickup coil arrangement. The angle sensor according to the innovative concept described herein further comprises a circuit that is designed to derive an induction strength signal representing the signal strength of the induction signals from the induction signals and to ascertain the spatial clearance between the rotor and the stator on the basis of the induction strength signal, and to generate a corresponding clearance signal.

BRIEF DESCRIPTION OF THE DRAWINGS

Implementations and further advantageous aspects of this inductive angle sensor are given in the respective dependent patent claims.

Some example implementations are illustrated, by way of example, in the drawing and are explained below. Here.

DETAILED DESCRIPTION

Example implementations are described with reference to the figures in more detail below, wherein elements with the same or similar functions are given the same reference signs.

Method steps that are illustrated in one block diagram and explained in that context can also be carried out in a sequence other than that illustrated or described. In addition, method steps that relate to a specific feature of a device can be exchanged with this very feature of the device, and the opposite is equally true.

Figure 1:
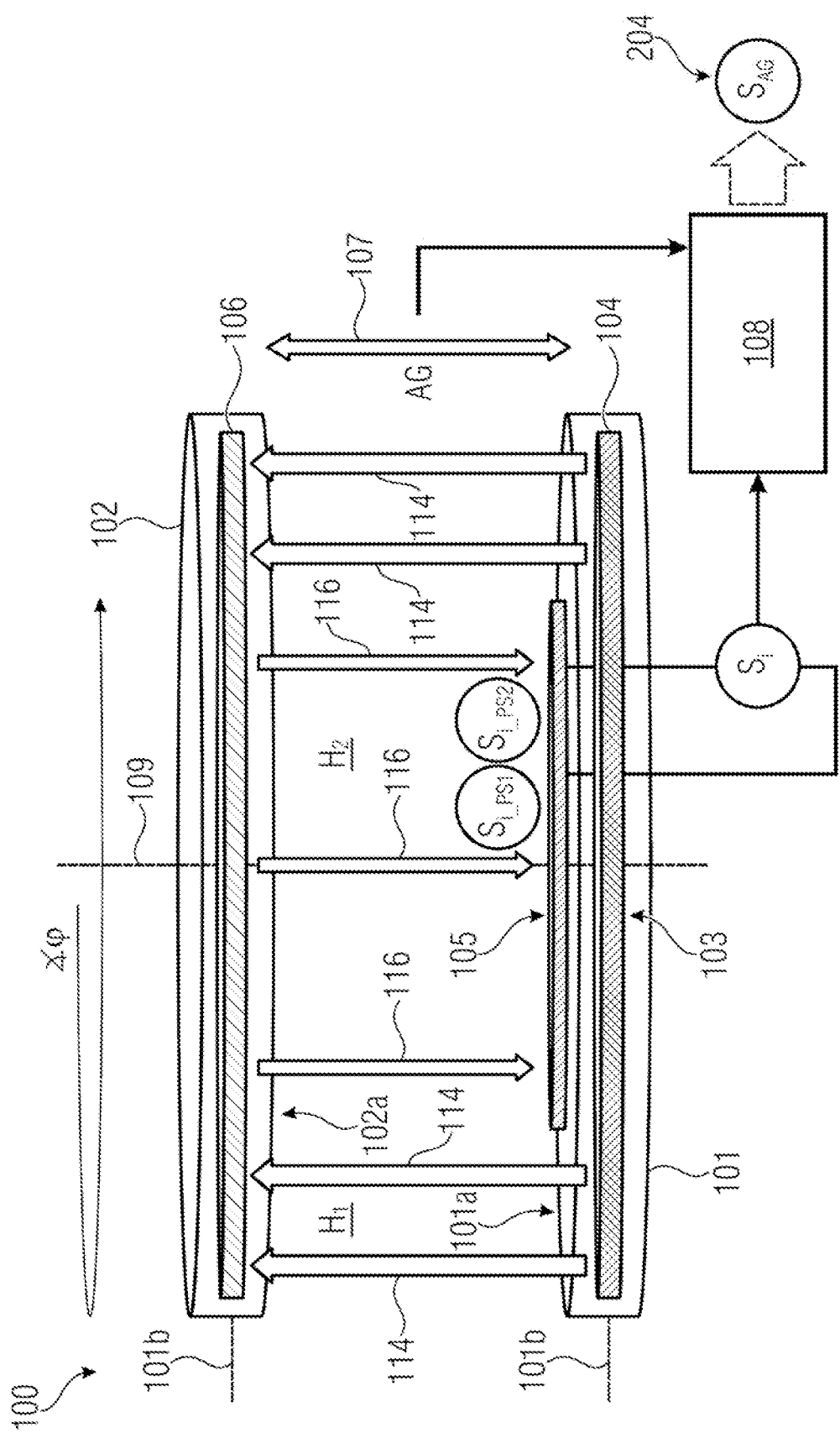
FIG. 1 shows a schematic side view of an inductive angle sensor according to one example implementation.

FIG. 1 shows a first example implementation of an inductive angle sensor 100 according to the innovative concept described herein.

The inductive angle sensor 100 comprises a stator 101 and a rotor 102 which is arranged rotatably with respect to the stator 101. The inductive angle sensor 100 is designed to determine a true or real rotation angle co between the rotor 102 and the stator 101. The true rotation angle co is also sometimes herein identified as phi.

The stator 101 comprises an excitation oscillating circuit 103. The excitation oscillating circuit 103 can comprise at least one inductance, for example a corresponding excitation coil 104. The excitation coil 104 is electrically conductive, and can comprise one or a plurality of windings. The excitation coil 104 can also be referred to as the activation coil or the exciter coil. The excitation oscillating circuit 103 can optionally comprise an oscillator and, optionally again, a resistor and/or a capacitor (not illustrated). The stator 101 can furthermore comprise a pickup coil arrangement 105 that can also be referred to as the reception coil arrangement.

The rotor 102, which is arranged rotatably with respect to the stator 101, can comprise at least one inductive target arrangement 106. The target arrangement 106 can also comprise a coil with one or a plurality of windings, or can be designed as such a coil. The target arrangement 106 can alternatively comprise or be designed as a solid component, for example a punched-out metal sheet.

In principle, the excitation oscillating circuit 103 or the excitation coil 104 and the pickup coil arrangement 105 and the target arrangement 106 can be arranged along a common axis of rotation 109 or can be arranged vertically above one another along the common axis of rotation 109. The excitation coil 104 and the pickup coil arrangement 105 and the target arrangement 106 can here be arranged concentrically around the common axis of rotation 109. The respective diameters of the excitation coil 104 and the pickup coil arrangement 105 and the target arrangement 106 can be different. The diameter of the excitation coil 104 can for example be larger than the diameter of the pickup coil arrangement 105 and/or of the target arrangement 106.

The excitation oscillating circuit 103 and, in particular, the excitation coil 104 can be energizable with an alternating current or an alternating voltage. The excitation coil 104 can generate a magnetic field 114 in reaction to this alternating current or this alternating voltage, which magnetic field can be directed outside, and in particular in the direction of the rotor 102. The target arrangement 106 that is arranged in or at the rotor 102 is magnetically coupled to the excitation coil 104 that is arranged in or at the stator 101. This means that the target arrangement 106 can receive the magnetic field 114 generated by the excitation coil 104, whereby a corresponding induction current is in turn induced in the target arrangement 106. The excitation coil 104 can be rotationally symmetrical. An induction current that is independent of the true rotation angle co of the rotor 102 relative to the stator 101 thus flows in the target arrangement 106. The induction current induced in the target arrangement 106 in turn for its part causes a magnetic field 116 in the target arrangement 106 which magnetic field can be directed outside, and in particular in the direction of the stator 101. The magnetic field 116 can have a magnetic field pattern that depends on the geometric form of the target arrangement 106. This means that the magnetic field pattern that is generated can be permanently coupled to the respective target arrangement 106.

The magnetic field 116 emerging from the target arrangement 106 can be received by the pickup coil arrangement 105 arranged in or at the stator 101. If the rotor 102 moves relative to the stator 101, the magnetic field 116 emerging from the target arrangement 106 or the corresponding magnetic field pattern also moves relative to the stator 101. This means that if an observer rotates synchronously with the target arrangement 106, a change in the magnetic field is not seen. In the stator 101, which is movable relative to the rotor 102, on the other hand, a change in the magnetic field is seen at a fixed location, since the entire magnetic field pattern also moves. As a result, induction signals $S_{i\_PS1}$, $S_{i\_PS2}$, for example induction currents or induction voltages, are induced in the pickup coil arrangement 105 in reaction to the changing magnetic field 116. The signal strength of the two induction signals $S_{i\_PS1}$, $S_{i\_PS2}$ can be expressed through a corresponding induction strength signal $S_i$ which can in turn be derived from the two induction signals $S_{i\_PS1}$, $S_{i\_PS2}$. Details of this will be explained in more detail below. The signal strength or the amplitude of the induction strength signal $S_I$, can depend here on the strength of the received magnetic field 116.

The strength of the magnetic field 116 at a fixed location can depend on the current position, e.g. on the true rotation angle co between the rotor 102 and the stator 101 although there is no change if the location moves/rotates synchronously with the rotor 102. If, however, the spatial clearance 107 between the rotor 102 and the stator 101 changes, then there is, on the other hand, a change in the strength of the magnetic field 116 and thus the signal strength that can be expressed by way of the induction strength signal $S_i$.

As is shown schematically and not true to scale in FIG. 1, a variable spatial clearance 107 that depends on the type of construction exists between the stator 101 and the rotor 102. The spatial clearance 107 can be measured between the two mutually opposing surfaces 101a, 102a of the rotor 102 and of the stator 101. Air for example can be present between the rotor 102 and the stator 101, for which reason the spatial clearance 107 can also be referred to as an air gap (abbreviated: 'AG'). The spatial clearance 107 can, alternatively, also be measured as a mean clearance between the rotor 102 and the stator 101, in which case the clearance is measured between the respective horizontally extending (e.g. perpendicular to the axis of rotation 109) center lines 101b, 102b of the rotor 102 and of the stator 101. In this case, the corresponding material thickness of the rotor 102 and of the stator 101 would be included in the calculation of the spatial clearance 107 in addition to the air gap.

The spatial clearance 107 between the stator 101 and the rotor 102 can differ depending on the construction, which means that different inductive angle sensors of different constructions can have different spatial clearances 107 between their respective rotor 102 and stator 101. Angle sensors of the same construction can also have different spatial clearances 107 between their respective rotor 102 and stator 101, for example as a result of assembly tolerances. The spatial clearance 107 between rotor 102 and stator 101 can accordingly thus be individual to the angle sensor.

In addition to this, the pickup coil arrangement 105 can comprise multiple coils and/or the target arrangement 106 can comprise multiple inductive targets which can then in turn have different spatial clearances with respect to one another.

Different spatial clearances 107 between rotor 102 and stator 101 and/or between individual coils however cause the induction currents or the induced magnetic fields 114, 116 to have different signal strengths. This can lead to inaccuracies and deviations in the determination of the current true rotation angle φ of the rotor 102 relative to the stator 101. Thus an angle sensor with a large spatial clearance 107 between rotor 102 and stator 101 will for example deliver a weaker induction signal $S_i$ than an angle sensor with a relatively smaller spatial clearance 107 between rotor 102 and stator 101.

In addition to this, the spatial clearance 107 that is individual to the angle sensor is not generally known. The spatial clearance 107 would theoretically to this end have to be measured for each individual angle sensor 100 before it is shipped. In practice, however, this cannot be realized due to the high effort that is required and the associated high costs.

The angle sensor 100 described herein provides a remedy to this, in that the spatial clearance 107 is taken into consideration when determining the true rotation angle φ between the rotor 102 and the stator 101. The angle sensor 100 can comprise a circuit 108 for this purpose which is designed to ascertain the spatial clearance 107 between the rotor 102 and the stator 101, also referred to as the air gap (abbreviated: 'AG'), on the basis of the induction strength signal $S_i$, and to generate a corresponding clearance signal 204 ($S_{AG}$).

Figure 2:
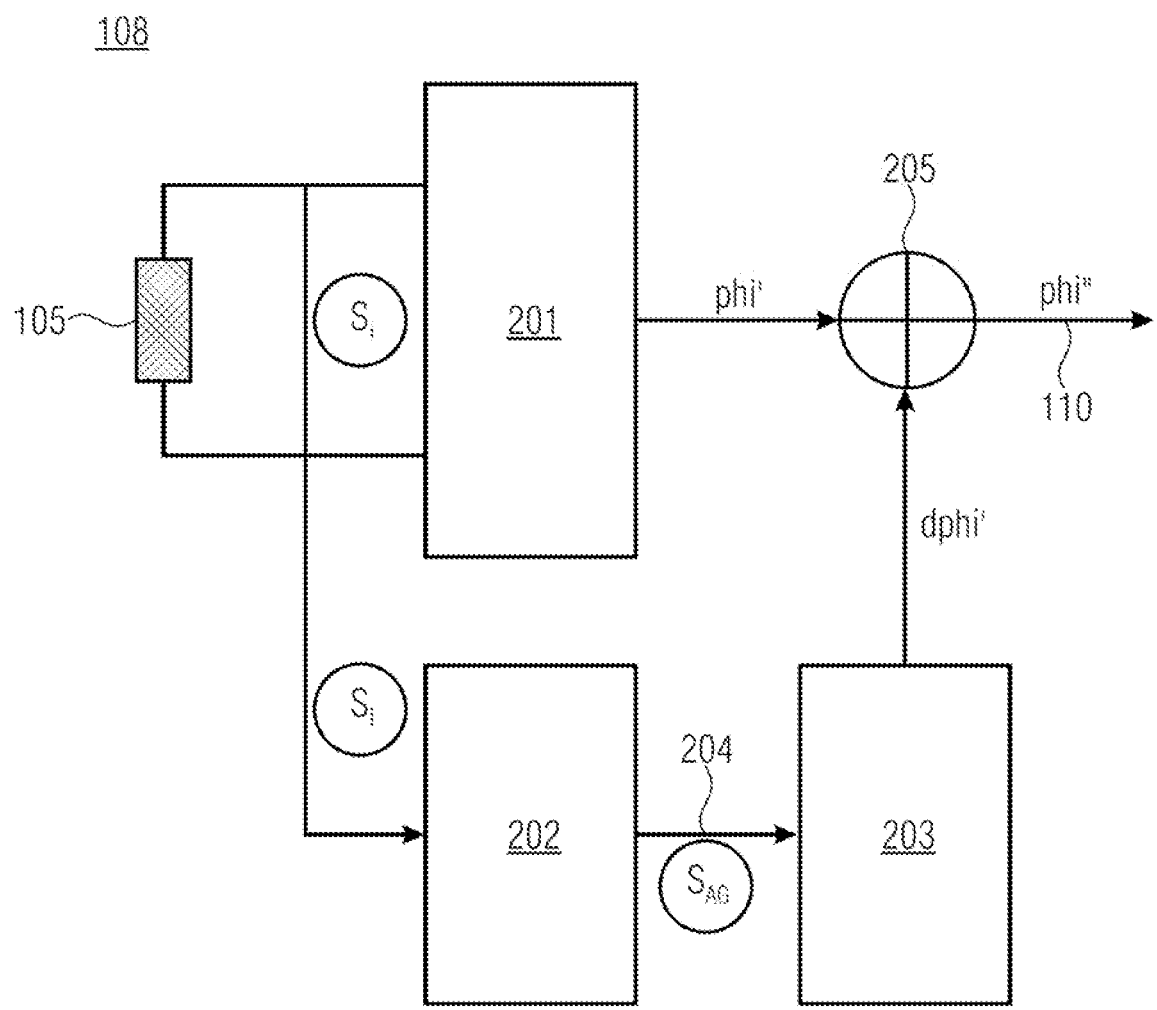
FIG. 2 shows a schematic block diagram of a circuit of an inductive angle sensor according to one example implementation.

FIG. 2 shows a schematic block diagram of a corresponding circuit 108 according to the innovative concept described herein. The circuit 108 can for example comprise an angle calculation unit 201, a clearance ascertainment unit 202, and a calibration unit 203.

The circuit 108 can for example use the clearance signal 204 previously described in order to ascertain a calibrated rotation angle signal 110, which is also referred to herein as phi'' or φ''. This calibrated rotation angle signal phi'' represents the current true rotation angle φ between the stator 101 and the rotor 102. In comparison with conventional angle sensors, the calibrated rotation angle signal phi'' can however be ascertained on the basis of the induction strength signal $S_i$ and/or on the basis of the clearance signal 204, e.g. taking the spatial clearance 107 between the rotor 102 and the stator 101 into account. This means that the spatial clearance 107 can be ascertained, and can be included in the determination of the true rotation angle φ on the basis of the induction strength signal $S_i$. The inductive angle sensor 100 according to the innovative concept described herein accordingly delivers a rotation angle signal phi'' that has been corrected or compensated for by the ascertained spatial clearance 107. This process can substantially be comparable to a calibration, so that the corresponding signal can also be referred to as a calibrated rotation angle signal phi''.

The circuit 108 can also be designed to output the ascertained clearance signal 204 to increase the reliability of the inductive angle sensor 100. If the value of the clearance signal 204 is for example too large, it may be unreliable, and the inductive angle sensor 100 could switch to an emergency mode. This means that the ascertainment of the clearance signal 204 could be used for an improvement of the position accuracy and/or for an increase in the reliability of the inductive angle sensor 100.

One possibility for ascertaining the clearance signal 204 is to be explained in more detail below with reference to FIG. 2. The induction strength signal $S_i$, which can be derived from the induction signals $S_{i\_PS1}$, $S_{i\_PS2}$ generated by the pickup coil arrangement 105, can be fed to the angle calculation unit 201. The angle calculation unit 201 can be designed to ascertain an uncalibrated rotation angle signal phi', which represents an uncalibrated angle value, on the basis of the induction strength signal $S_i$. The uncalibrated angle value phi' corresponds to the measured true rotation angle φ between the rotor 102 and the stator 101 with an uncalibrated or coarse resolution, e.g. not taking the spatial clearance 107 between the rotor 102 and the stator 101 into consideration.

The induction strength signal $S_i$ can also be fed to the clearance ascertainment unit 202. The clearance ascertainment unit 202 can be designed to ascertain the spatial clearance 107 between the rotor 102 and the stator 101. The clearance ascertainment unit 202 can for example be designed to ascertain the spatial clearance 107 between the rotor 102 and the stator 101 on the basis of the spatial clearance between the pickup coil arrangement 105 and the target arrangement 106. Details of this are explained in more detail with reference to the following figures. The clearance ascertainment unit 202 can generate a clearance signal 204 that represents the ascertained spatial clearance 107 between the rotor 102 and the stator 101.

The clearance signal 204 that is output from the clearance ascertainment unit 202 can be fed to the calibration unit 203. The calibration unit 203 can be designed to determine an angle correction value dphi' on the basis of the clearance signal 204, and to output a corresponding angle correction value signal dphi'. The angle correction value dphi' indicates the deviation of the measured rotation angle phi' between the rotor 102 and the stator 101 from the true rotation angle φ between the rotor 102 and the stator 101, wherein this deviation can result from the spatial clearance 107 between the rotor 102 and the stator 101.

The circuit 108 can further comprise a combiner 205, that is designed to combine the angle correction value signal dphi' that is output from the calibration unit 203 with the uncalibrated rotation angle signal phi that is output from the angle calculation unit 201. The uncalibrated rotation angle signal phi' that is output from the angle calculation unit 201 and represents the true rotation angle φ between the rotor 102 and the stator 101 with a coarse resolution, can thus be corrected or compensated for by the ascertained angle correction value dphi'. As a result, the combiner 205 can output a corrected or calibrated rotation angle signal phi''. The calibrated rotation angle signal phi'' represents the true rotation angle φ between the rotor 102 and the stator 101 with a higher or more accurate resolution, e.g. taking the spatial clearance 107 between the rotor 102 and the stator 101 into consideration. In other words, the calibration unit 203 can thus be designed to determine the angle correction value signal dphi' on the basis of the clearance signal 204, and to take the corresponding angle correction value dphi' into consideration when ascertaining the calibrated rotation angle signal phi''.

For this purpose, the circuit 108 can for example be designed to determine the angle correction value dphi' from the clearance signal 204 using a mathematical calculation specification, for example using a formula or of an algorithm. Alternatively or in addition, the circuit 108 can be designed to determine the angle correction value dphi' from the clearance signal 204 using a lookup table. The lookup table can be filled with values that link a specific signal strength of the clearance signal 204 to a concrete numerical value for the spatial clearance 107 between the rotor 102 and the stator 101.

Figure 3:
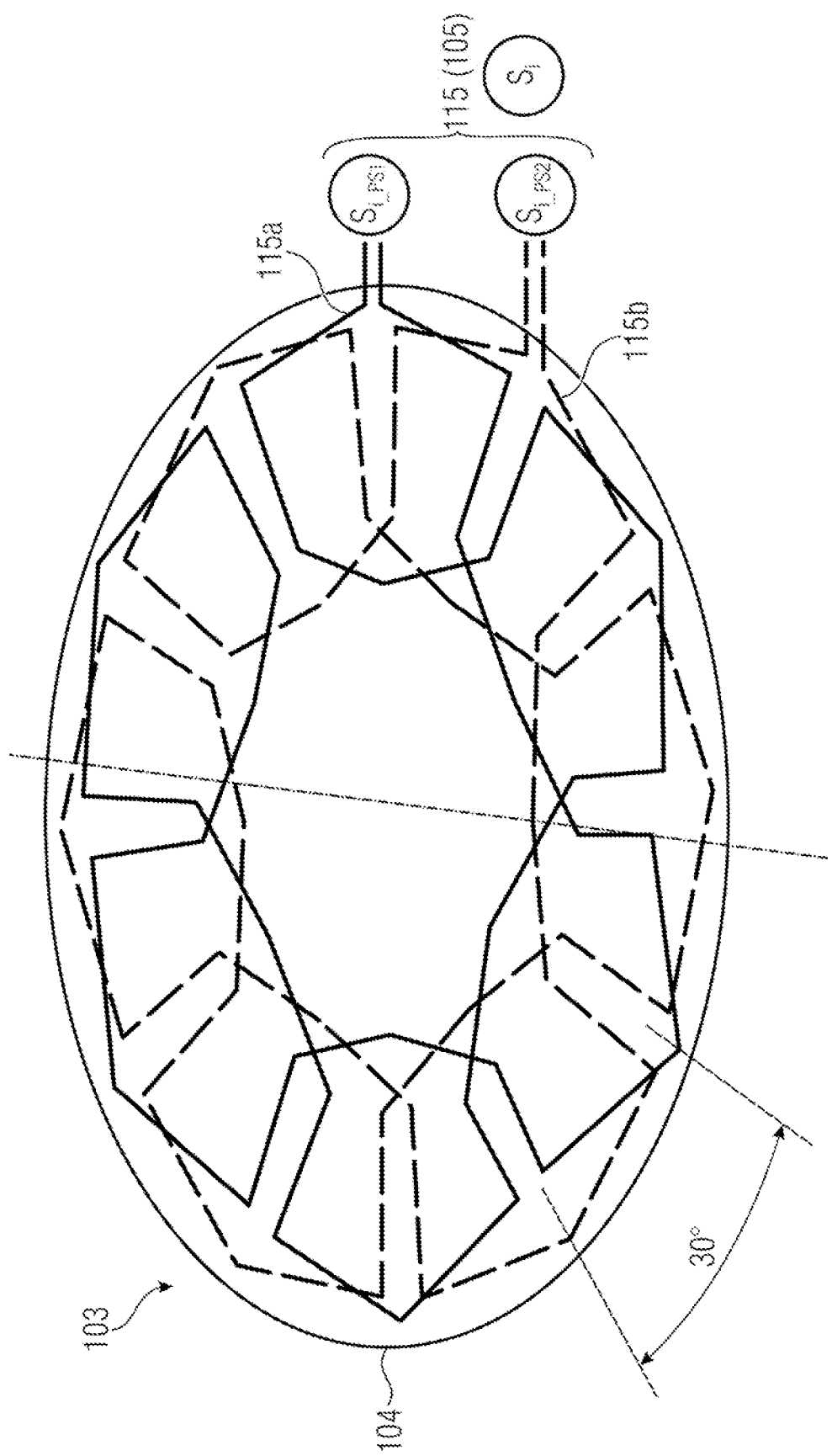
FIG. 3 shows a schematic plan view of an excitation oscillating circuit or of an excitation coil and a pickup coil pair of an inductive angle sensor according to one example implementation.

FIG. 3 shows a schematic view of an excitation oscillating circuit 103 or an excitation coil 104 and a pickup coil arrangement 105 according to one example implementation. In this example implementation, the pickup coil arrangement 105 can comprise a pickup coil pair 115 with a first pickup coil 115a and a second pickup coil 115b.

The two pickup coils 115a, 115b of the pickup coil pair 115 or of the pickup coil arrangement 105 can exhibit an n-fold symmetry or an n-fold rotational symmetry. In this non-restrictive example, the pickup coil arrangement 105 can exhibit a threefold symmetry, e.g. n=3. Rotational symmetrical refers for example to a body which, following a rotation through a defined angle, and in particular through 360°/n, about its center is mapped reflected onto itself. The angle of rotation can be an integral divisor n of the full angle. This integer n is a characteristic figure for the n-fold rotational symmetry, and is also known as the "periodicity number". This symmetry is accordingly also called n-fold rotational symmetry. In other words, a body can then precisely exhibit an n-fold symmetry if it can be rotated through 360° *k/n about an axis, (where n and k are integral variables), and it looks the same after the rotation. In this respect, reference is made at this point to the German patent application with the official file reference 102019213174.3, whose content is hereby incorporated through reference.

As is further shown by way of example and schematically in FIG. 3, the two pickup coils 115a, 115b can have an identical geometrical form and be arranged offset with respect to one another, or rotated about the common axis of rotation 109 with respect to one another. The two pickup coils 115a, 115b can for example be offset with respect to one another in such a way that the first pickup coil 115a generates a first pickup coil signal $S_{i\_PS1}$ and the second pickup coil 115b generates a second pickup coil signal $S_{i\_PS2}$ that is different from and offset in phase from the first pickup coil signal $S_{i\_PS1}$. This can for example involve orthogonal pickup coil signals, wherein the first pickup coil signal $S_{i\_PS1}$ is shifted in phase through 90° with respect to the second pickup coil signal $S_{i\_PS2}$.

By definition, orthogonal signals are signals of sinusoidal type with a 90° phase shift. This can for example be achieved through a rotation of one pickup coil 115a with respect to the respectively other pickup coil 115b along the direction of movement through 360°/n/4. It is, however, moreover also possible to rotate the pickup coils 115a, 115b through another angle with respect to one another, so that their signals are then not shifted in phase with respect to one another through 90°, but through a corresponding different angle, for example 60° or 45°.

The sinusoidal curve of the pickup coil signals $S_{i\_PS1}$, $S_{i\_PS2}$ described herein refers to the sinusoidal curve as a function of the distance travelled or of the rotor position (e.g. of the true rotation angle φ between rotor 102 and stator 101), and not the sinusoidal signal curve as a function of time. The pickup coil arrangement 105 can be energized with alternating voltage, and thus oscillate a few million times per second. This oscillation (which may be sinusoidal) is not what is meant here however; that is to say, those components of the pickup coil signals $S_{i\_PS1}$, $S_{i\_PS2}$ that remain after the demodulation e.g. after the part of the oscillation that changes over time has been eliminated are considered. These depend on the rotor angle (e.g. on the true rotation angle φ between rotor 102 and stator 101).

According to the example implementation in FIG. 3, in which the two pickup coils 115a, 115b are rotated through 30° with respect to one another, the first pickup coil signal $S_{i\_PS1}$ can follow essentially a cosinusoidal waveform, and the second pickup coil signal $S_{i\_PS2}$ can follow essentially a sinusoidal waveform, e.g. $S_{i\_PS1}=S_i \cos$ and $S_{i\_PS2}=S_i \sin$. A combination of the two pickup coil signals $S_{i\_PS1}$, $S_{i\_PS2}$ can, at least in one partial segment of a full period of 360°, deliver an unambiguous angle signal, from which the true rotation angle φ between the stator 101 and the rotor 102 can be derived. Reference is also made in this respect to the German patent application with the official file reference 102019213174.3, whose content is incorporated through reference.

Figure 4:
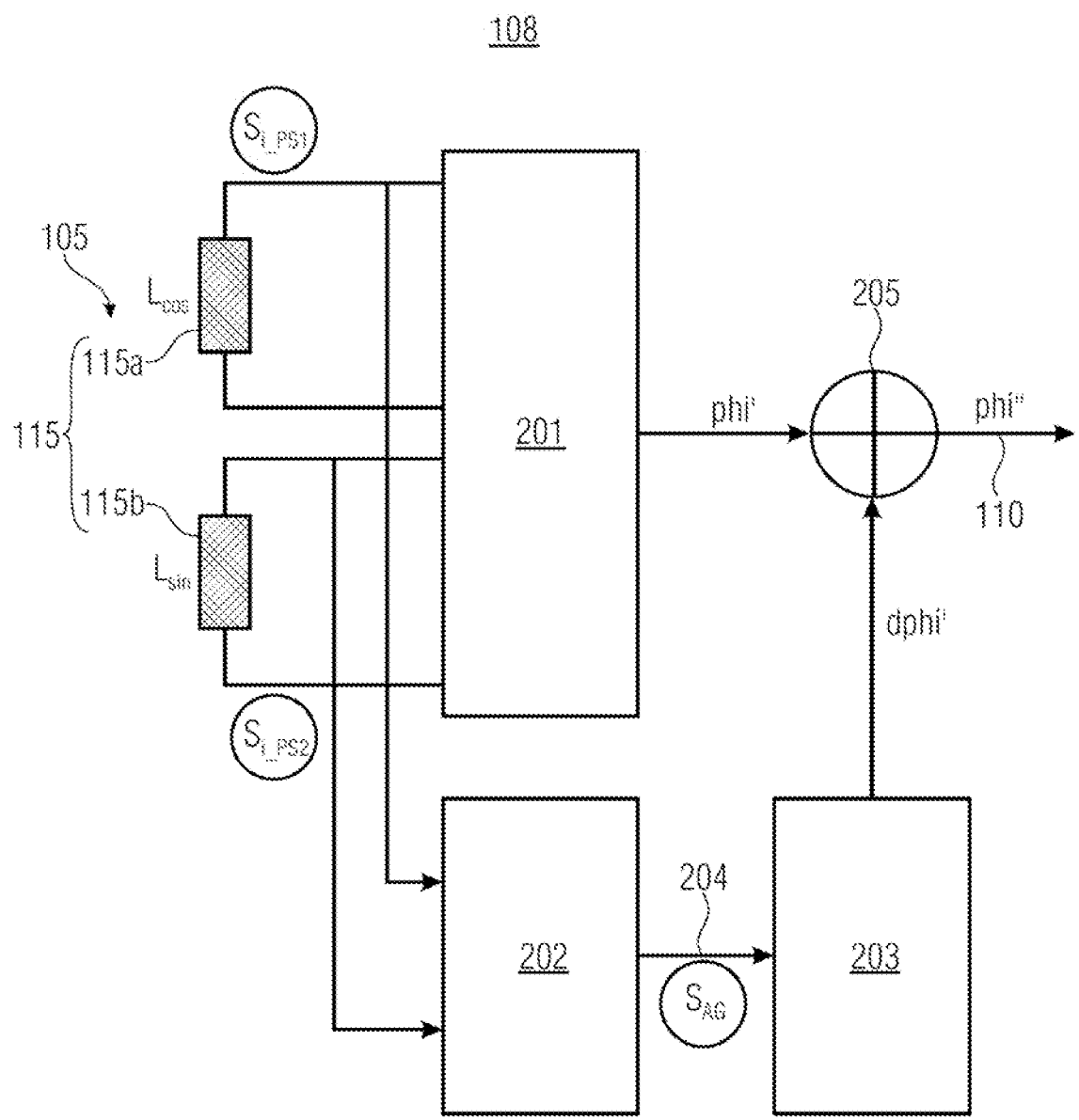
FIG. 4 shows a schematic block diagram of a circuit of an inductive angle sensor according to one example implementation.

FIG. 4 shows a schematic block diagram of a further non-restrictive example implementation of an inductive angle sensor 100. The construction is largely similar to the example implementation discussed above with reference to FIG. 2, wherein elements with the same reference sign have the same function.

The implementation shown in FIG. 4 can comprise a pickup coil pair 115 with n-fold symmetry. To avoid short-circuits, the two individual pickup coils 115a, 115b can be arranged without contact, and at least in sections at different levels, along the common axis of rotation 109, for example at different metallization layers within a substrate, for example within a PCB (PCB: printed circuit board). The two pickup coils 115a, 115b arranged in or at the stator 101 can thus have different spatial clearances from the rotor 102 or from the target arrangement 106 arranged in or at the rotor 102. This can lead to deviations in the angle measurement of the relative rotation angle φ between the rotor 102 and the stator 101.

The circuit 108 shown by way of example in FIG. 4 can however reduce or compensate for this angle deviation, and thus calibrate the inductive angle sensor 100. The first pickup coil 115a shown here by way of example can generate a, for example cosinusoidal, first pickup coil signal $S_{i\_PS1}$, and the second pickup coil 115b can generate a second pickup coil signal $S_{i\_PS2}$ that is essentially offset in phase by 90° thereto and thus approximately sinusoidal, e.g. $S_{i\_PS1}=S_i \cos$ and $S_{i\_PS2}=S_i \sin$.

This phase offset between the two pickup coil signals $S_{i\_PS1}$ and $S_{i\_PS2}$ permits an unambiguous determination of the true rotation angle φ between the rotor 102 and the stator 101 on the basis of a combination of the two pickup coil signals $S_{i\_PS1}$ and $S_{i\_PS2}$ of the two pickup coils 115a, 115b. The induction strength signal $S_i$ of the pickup coil arrangement 105 discussed previously can be derived from such a combination of the two pickup coil signals $S_{i\_PS1}$ and $S_{i\_PS2}$, for example using a suitable tangent combination of the two pickup coil signals $S_{i\_PS1}$ and $S_{i\_PS2}$. A conceivable computation would for example be possible using the following formula:

$$\varphi = \text{ATAN2}(S_{i_{PS2}}, S_{i_{PS1}}) \quad [1]$$

The determination of the true rotation angle φ between the rotor 102 and the stator 101 can here be unambiguous, at least over a certain partial region of a full rotation through 360°, which depends in turn on the periodicity number of the rotation symmetry of the two pickup coils 115a, 115b. The determination of the true rotation angle φ between the rotor 102 and the stator 101 is thus for example unambiguous over an angle range of 360°/n. In the case of a threefold symmetry, the true rotation angle φ would thus for example be determinable unambiguously over a range of 120°.

As can be seen in FIG. 4, the two pickup coil signals $S_{i\_PS1}$ and $S_{i\_PS2}$ can be fed to the angle calculation unit 201 which can calculate an uncalibrated angle signal phi' from them, e.g. without giving consideration to the spatial clearance 107 between the rotor 102 and the stator 101.

The two pickup coil signals $S_{i\_PS1}$ and $S_{i\_PS2}$ can moreover be fed to the clearance ascertainment unit 202 which can ascertain the spatial clearance 107 between the rotor 102 and the stator 101 and output a corresponding clearance signal 204.

The clearance signal 204 can be fed to the calibration unit 203. Taking the value of the clearance signal 204 into account, the calibration unit 203 can calculate a corresponding angle correction value dphi', which can in turn be fed to the combiner 205. The combiner 205 can combine the uncalibrated angle value phi' with the angle correction value dphi' and generate a calibrated rotation angle signal phi" therefrom, e.g. phi"=phi' dphi'. The calibrated rotation angle signal phi" represents the true rotation angle φ between the rotor 102 and the stator 101 taking the spatial clearance 107 between the rotor 102 and the stator 101 into consideration.

The angular error can in this way be reduced or compensated for, which, in comparison with conventional uncalibrated angle sensors, leads to a significantly more accurate value for the true rotation angle φ.

In other words it can thus be the that the circuit 108 can be designed to initially calculate a coarse estimate of the true rotation angle φ in the angle calculation unit 201 and to output a corresponding uncalibrated rotation angle signal phi'. The spatial clearance 107 between the rotor 102 and the stator 101 can be estimated in the clearance ascertainment unit 202, and a corresponding clearance signal 204 can be output. The estimated clearance value 204 can be linked to a corresponding angular error in the calibration unit 203, for example using a mathematical calibration calculation formula and/or a calibration table. The angular error can be output as an angle correction signal dphi'. The angle correction signal dphi' can here be a function of the clearance value 204, e.g. dphi'=f(clearance value).

As explained above, the spatial clearance 107 between the rotor 102 and the stator 101 can be ascertained on the basis of the spatial clearance between the pickup coil arrangement 105 and the target arrangement 106. According to the innovative concept described herein, this can be done in a variety of ways. Some non-restrictive examples of this are to be explained in more detail below.

Figure 5:
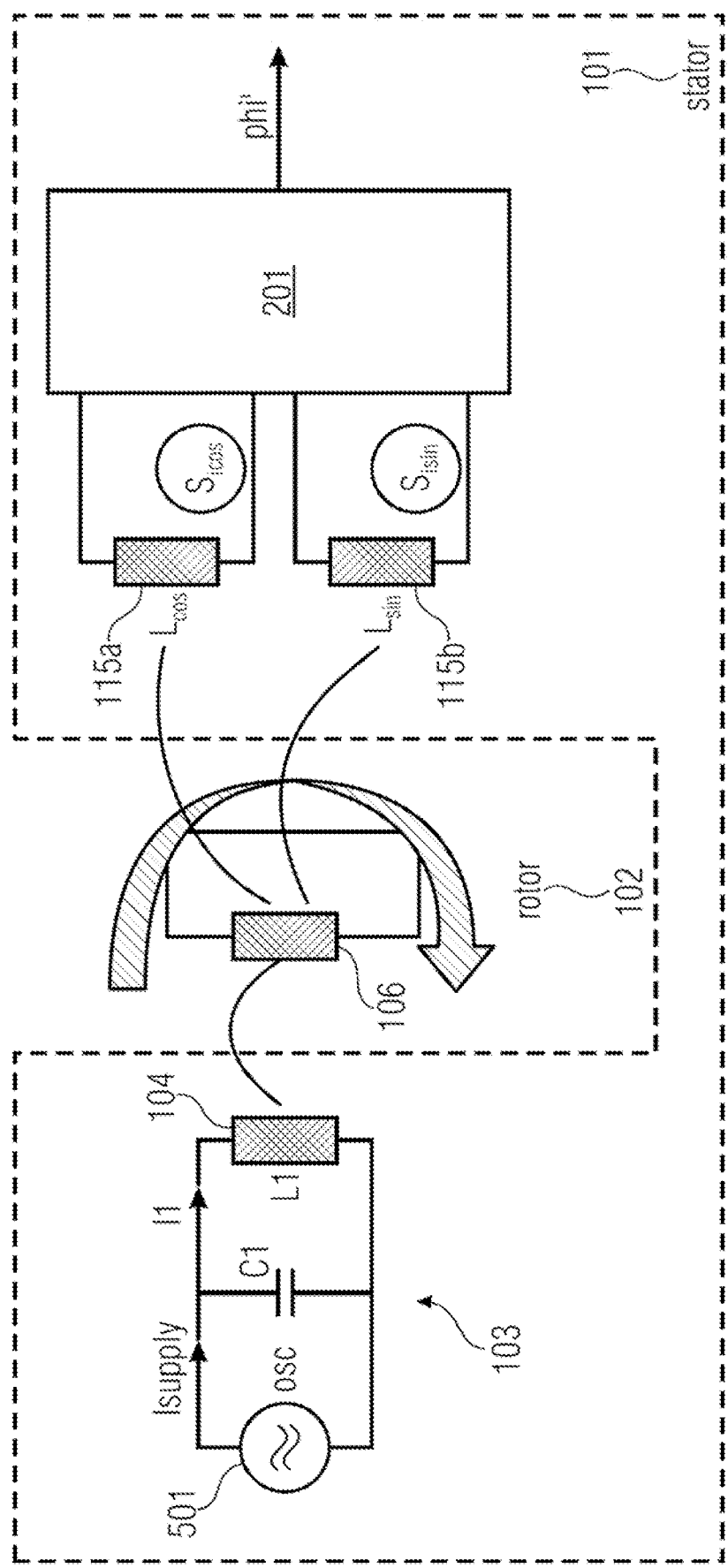
FIG. 5 shows a schematic view of a stator, a rotor and a circuit of an inductive angle sensor according to one example implementation with one pickup coil pair.

FIG. 5 shows a schematic block diagram for the general explanation of factors having an influence on the determination of the rotation angle φ between a rotor 102 and a stator 101, wherein here, purely by way of example, a system with two pickup coils 115a, 115b is shown, and wherein the system delivers an uncalibrated rotation angle signal phi'. The two pickup coils 115a, 115b of the pickup coil pair 115 can, as was discussed previously with reference to FIG. 3, be arranged with an offset to one another, and generate orthogonal pickup coil signals $S_{i\_PS1}$, $S_{i\_PS2}$, for example sinusoidal and cosinusoidal induced pickup coil signals $S_{i\_PS1}=S_i$ cos and $S_{i\_PS2}=S_i$ sin. The induction strength signal $S_i$ that can be derived from this can, as explained above, be ascertained from a combination of the two sinusoidal and cosinusoidal pickup coil signals $S_{i\_PS1}=S_i$ cos, $S_{i\_PS2}=S_i$ sin of the pickup coil pair 115, wherein for example in the case of orthogonal signals, the following can apply:

$$S_i=\sqrt{S_{icos}^2+S_{isin}^2} \quad [2]$$

The signal strength of the pickup coil signals $S_{i\_PS1}=S_i$ cos and $S_{i\_PS2}=S_i$ sin induced in the pickup coils 115a, 115b can depend here on a plurality of factors. The signal strength represented by the induction strength signal $S_i$ can for example depend on the true rotation angle φ between the rotor 102 and the stator 101, e.g. on the true relative positioning or position between the rotor 102 and the stator 101. The amplitude and the arithmetic sign of the induction signal $S_i$ can thus for example change as the positioning of the rotor 102 changes relative to the stator 101.

If the two pickup coil signals $S_{i\_PS1}=S_i$ cos and $S_{i\_PS2}=S_i$ sin were to be perfectly orthogonal to one another and thus have a perfect sinusoidal or cosinusoidal waveform, then according to the above formula the induction strength signal $S_i$ would be independent of the rotation angle φ. If, however as is usually the case in reality they deviate slightly from the perfect sinusoidal form, then the induction strength signal $S_i$ will only be approximately constant with respect to the rotor position (true rotation angle φ between rotor 102 and stator 101), e.g. $S_i$ can have small fluctuations. It is desirable to keep these fluctuations small, so that the induction strength signal $S_i$ only reflects the spatial clearance 107, and not, as far as possible, the rotor position p. To achieve this, the two pickup coil signals $S_{i\_PS1}=S_i$ cos and $S_{i\_PS2}=S_i$ sin can be multiplied by weighting factors that are in turn suitable functions of the angle phi' (e.g. of the coarse estimate of the true rotation angle φ).

This means that in the place of the above formula [2], the signal strength, or the induction strength signal $S_i$ that represents the signal strength, can be derived or ascertained from the two pickup coil signals $S_{i\_PS1}=S_i$ cos and $S_{i\_PS2}=S_i$ sin as follows:

$$S_i=\sqrt{(c(phi')*S_i\cos)^2+(s(phi')*S_i\sin)^2} \quad [3]$$

Thus for example, the pickup coil signals $S_{i\_PS1}=S_i$ cos and $S_{i\_PS2}=S_i$ sin can accordingly first be multiplied by suitable weighting factors c(phi') and s(phi'). The intermediate results can then again be squared, subsequently added, and then the root can be extracted from the result.

The signal strength, or the induction strength signal $S_i$, can moreover depend on the electric current $I_1$ flowing through the excitation oscillating circuit 103 or through the excitation coil 104. The excitation oscillating circuit 103 can for example comprise an oscillator 501 for generating a supply current $I_{supply}$ in the form for example of an alternating current signal. The excitation oscillating circuit 103 can, furthermore, comprise a capacitor C1. The excitation coil 104 is designed as an inductor $L_1$. The value of the supply current $I_{supply}$ can be known. The current $I_1$ arriving at the excitation coil 104 however depends, inter alia, on the quality of the oscillating circuit 103, and can thus deviate from the supply current $I_{supply}$ by an unknown amount. The signal strength of the induction signal $S_i$ can also fall here as the flow of current $I_1$ through the excitation coil 104 falls, or can also increase as the flow of current $I_1$ through the excitation coil 104 increases.

The signal strength or the induction signal $S_i$, can also depend on the spatial clearance 107 between the rotor 102 and the stator 101. The signal strength or amplitude of the induction strength signal $S_i$ can for example fall monotonically as the spatial clearance 107 increases.

This accordingly means that there can be essentially three factors that can influence the signal strength or the amplitude of the induction strength signal $S_i$, namely the current true position of the rotor 102 relative to the stator 101, the flow of current $I_1$ through the excitation oscillating circuit 103 or through the excitation coil 104, and the spatial clearance 107 between the pickup coil arrangement 105 and the target arrangement 106. All three factors can initially be unknown.

In order to be able to take the spatial clearance 107 between the rotor 102 and the stator 101 into consideration when ascertaining the calibrated rotation angle signal phi", the circuit 108 described herein can be designed according to one example implementation to reduce or to compensate for the position-dependent angle dependency, e.g. the dependency on the true positioning between the rotor 102 and the stator 101. According to a further example implementation, the circuit 108 can be designed to reduce or to compensate for the dependency of the flow of current h through the excitation coil 104.

One example implementation can provide that the position-dependent angle dependency is reduced or compensated for as follows:

- The pickup coil signals $S_{i\_PS1}$ and $S_{i\_PS2}$ generated in the pickup coils 115a, 115b can change according to an essentially sinusoidal or cosinusoidal waveform as the true rotation angle between rotor 102 and stator 101 varies
- The pickup coil signals $S_{i\_PS1}$ and $S_{i\_PS2}$ can be essentially orthogonal with respect to one another, e.g. have a phase offset through 90°
- The circuit 108 can for example thus be designed to ascertain the induction strength signal $S_i$ as follows:
  $S_i = (c(phi)*V \cos^2 + s(phi)*V \sin^2)^\alpha$, with for example: c=s=1 and α=½ or 1 (where V cos is the voltage induced in the first pickup coil 115a, and V sin is the voltage induced in the second pickup coil 115b)
  or: $S_i = cc(phi)*|V \cos| + ss(phi)*|V \sin|$
  The calculation can take place before or after the demodulation of the carrier frequency into the baseband, where this can be simplified after demodulation has been done
- The functions c(phi), s(phi), cc(phi), ss(phi) can be determined in that the voltages V cos and V sin are measured for given pickup coils 115a, 115b with associated target arrangement 106. The circuit 108 can be configured to use the functions c(phi), s(phi), cc(phi), ss(phi) to subsequently calculate the induction strength signal $S_i$ and to minimize the angle dependency of the induction strength signal $S_i$ (e.g. using developing the functions c(phi), s(phi), cc(phi), ss(phi) into power series or into Fourier series of phi' and subsequent ascertainment of the series coefficients through mathematical optimization methods)
- The induction strength signal $S_i$ generated in this way would thus in this case correspond to an angle positioning-corrected induction strength signal $S_{i\_St\_korr}$, in which the position-dependent angle dependency is reduced or compensated for, e.g. $S_i=S_{i\_St\_korr}$. In other words, the induction strength signal $S_i$ can thus be derived (e.g. using a formula or a table) on the basis of the at least two phase-shifted pickup coil signals $S_{i\_PS1}=S_i \cos$ and $S_{i\_PS2}=S_i \sin$, wherein the induction strength signal $S_i$ corresponds to the angle positioning-corrected induction strength signal $S_{i\_St\_korr}$.

According to an example implementation of this kind, the circuit 108 can accordingly thus be designed to correct (e.g. to reduce or to compensate for) the angle dependency of the induction strength signal $S_i$ on the current positioning of the rotor 102 relative to the stator 101, and to ascertain a corresponding positioning-corrected induction strength signal $S_{i\_St\_korr}$ e.g. $S_i=S_{i\_St\_korr}$. The circuit 108 can furthermore be designed to use the positioning-corrected induction strength signal $S_i=S_{i\_St\_korr}$ for the signal processing, and, using the concept described herein, to determine the calibrated rotation angle signal phi" on the basis of the positioning-corrected induction strength signal $S_i=S_{i\_St\_korr}$. The positioning-corrected induction strength signal $S_i=S_{i\_St\_korr}$ can for example be taken as an input signal to the angle calculation unit 201 and/or to the clearance ascertainment unit 202 (FIGS. 2 and 4).

The reduction or compensation explained above relates to the pickup coil signals $S_{i\_PS1}$ and $S_{i\_PS2}$, which accordingly are not position-corrected. This means that the pickup coils 115a, 115b supply pickup coil signals $S_{i\_PS1}$ and $S_{i\_PS2}$, that vary very strongly with the rotor rotation position φ—this is, after all, their primary task. The induction strength signal $S_i$ can now be derived from these pickup coil signals $S_{i\_PS1}$ and $S_{i\_PS2}$, with the intention that it varies depending on the rotor rotation position φ significantly less strongly than the pickup coil signals $S_{i\_PS1}$ and $S_{i\_PS2}$ themselves. This means that the pickup coil signals $S_{i\_PS1}$ and $S_{i\_PS2}$ are the reference with respect to which the angle variation is reduced.

A further example implementation can provide that the circuit 108 is designed to reduce or to compensate for the dependency on the flow of current $I_1$ through the excitation coil 104 as follows:

a) The circuit 108 can for example be designed to measure the value of the current $I_1$ flowing through the excitation coil 104, for example using an ammeter, and subsequently to let the measured value of the electric current $I_1$ flow in the signal processing, and/or b) the circuit 108 can for example be designed to estimate the current $I_1$ flowing through the excitation coil 104 on the basis of the supply current $I_{supply}$, when for example the Q-factor of the excitation oscillating circuit is known, and to form a ratio $S_i/I_1$, and/or c) the inductive angle sensor 100 can for example comprise two pickup coil pairs 115, 125, each with an associated inductive target 106a, 106b, wherein each pickup coil pair 115, 125 can have a different spatial clearance from the corresponding target arrangement 106a, 106b. The first pickup coil pair 115 can, as explained above, comprise two individual pickup coils 115a, 115b. Each pickup coil 115a, 115b generates a dedicated pickup coil signal $S_{i\_PS1}$, $S_{i\_PS2}$. The two pickup coil signals $S_{i\_PS1}$, $S_{i\_PS2}$ can accordingly be grouped together as a first pickup coil pair signal. A first coil pair induction strength signal $S_{i\_first}$ can then in turn be derived from the first pickup coil pair signal $S_{i\_PS1}$, $S_{i\_PS2}$ according to the above formulas [2] or [3], which corresponds to the signal strength of the induction signals $S_{i\_PS1}$, $S_{i\_PS2}$ generated in the first pickup coil pair 115a. The second pickup coil pair 125 can comprise two individual pickup coils 125a, 125b. Each pickup coil 125a, 125b generates a dedicated pickup coil signal $S_{i\_PS3}$, $S_{i\_PS4}$. The two pickup coil signals $S_{i\_PS3}$, $S_{i\_PS4}$ can accordingly be grouped together as a second pickup coil pair signal. A second coil pair induction strength signal $S_{i\_second}$ can then in turn be derived from the second pickup coil pair signal $S_{i\_PS1}$, $S_{i\_PS2}$ according to the above formulas [2] or [3], which corresponds to the signal strength of the induction signals $S_{i\_PS3}$, $S_{i\_PS4}$ generated in the second pickup coil pair 125a. The circuit 108 can be designed to ascertain a ratio between the first coil pair induction strength signal $S_{i\_first}$ and the second coil pair induction strength signal $S_{i\_second}$, e.g. according to $S_{i\_first}/S_{i\_second}$.

An induction strength signal $S_i$ generated in this way would in this case thus correspond to a current magnitude-corrected induction strength signal $S_{i\_I1\_korr}$, in which the dependency on the current magnitude h in the excitation coil 104 is reduced or compensated for with respect to the original induction strength signal $S_i$.

According to an example implementation of this kind, the circuit 108 can thus accordingly be designed to reduce and/or to compensate for the dependency on the current magnitude h in the excitation coil 104, and to determine a corresponding current magnitude-corrected induction strength signal $S_{i\_I1\_korr}$. The circuit 108 can further be designed to use the current magnitude-corrected induction strength signal $S_{i\_I1\_korr}$ instead of the uncorrected induction strength signal $S_i$ for the further signal processing, and to determine the calibrated rotation angle signal phi" on the basis of the current magnitude-corrected induction strength signal $S_{i\_I1\_korr}$. The current magnitude-corrected induction strength signal $S_{i\_I1\_korr}$ can for example be taken as an input signal to the angle calculation unit 201 and/or to the clearance ascertainment unit 202 (FIGS. 2 and 4).

As explained above under point b), the circuit 108 can in one example implementation be designed to estimate the current $I_1$ flowing through the excitation coil 104 on the basis of the supply current $I_{supply}$. The induction strength signal $S_i$ depends, as explained further above, inter alia on the current magnitude $I_1$ and the spatial clearance 107 between the rotor 102 and the stator 101. In order to ascertain the initially unknown spatial clearance 107 between the rotor 102 and the stator 101, the circuit 108 can be designed to ascertain a ratio between the estimated current magnitude $I_1$ and the measured induction strength signal $S_i$, e.g. according to $S_i/I_1$. This ratio $S_i/I_1$ can then accordingly be a measure for the spatial clearance 107 between the rotor 102 and the stator 101.

Figure 6A:
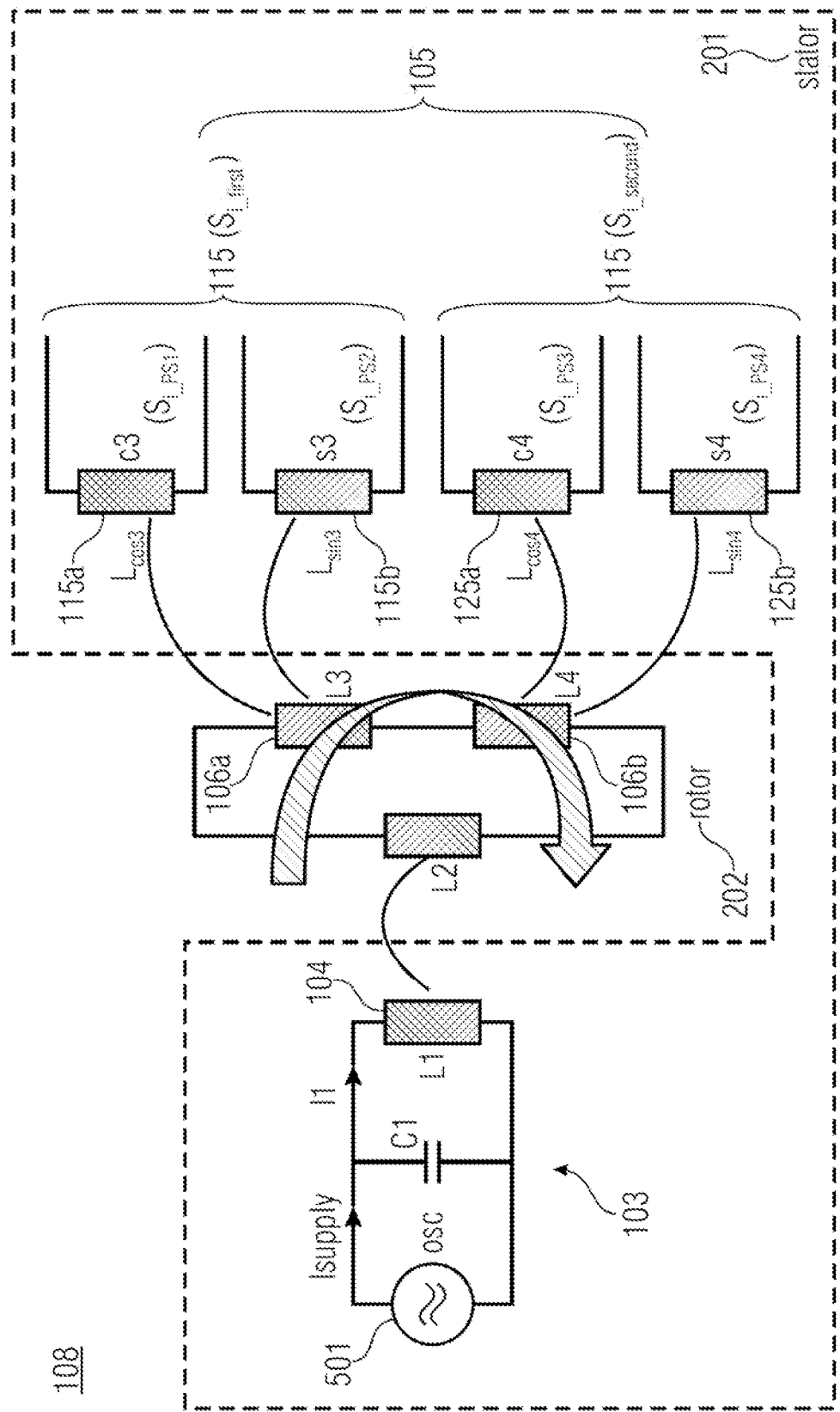
FIG. 6A shows a schematic view of a stator, a rotor and a circuit of an inductive angle sensor according to one example implementation with two pickup coil pairs.

As explained above under point c), in an alternative example implementation the spatial clearance 107 between the rotor 102 and the stator 101 can however also be ascertained using two pickup coil pairs 115, 125. FIG. 6A shows a schematic block diagram of an example implementation of an inductive angle sensor 100 with two pickup coil pairs 115, 125 for ascertaining the spatial clearance 107 between the rotor 102 and the stator 101.

The pickup coil arrangement 105 can for example accordingly comprise a first pickup coil pair 115 and a second pickup coil pair 125. The first pickup coil pair 115 can essentially correspond to the pickup coil pair 115 discussed so far and for example comprise a first pickup coil 115a and a second pickup coil 115b.

According to one conceivable implementation, the periodicity number of the first pickup coil pair 115 and of the second pickup coil pair 125, as well as the periodicity number of their respective target 106a, 106b can be different. The pickup coils 115a, 115b of the first pickup coil pair 115 can for example have an n-fold periodicity number (e.g. n=3), and the pickup coils 125a, 125b of the second pickup coil pair 125 can have an m-fold periodicity number, with m=n+x (e.g. m=4).

In the non-restrictive implementation illustrated in FIG. 6A, the first target 106a, the first pickup coil 115a and the second pickup coil 115b could thus for example have a periodicity number of n=3, and the second target 106b, the third pickup coil 125a and the fourth pickup coil 125b could have a periodicity number of m=4, e.g. L3, L cos 3, L sin 3 three-fold periodicity, and L4, L cos 4, L sin 4 four-fold periodicity. As a result, the first target 106a (L3) with three-fold periodicity does not couple a signal into the second pickup coil pair 125 (L cos 4, L sin 4) with four-fold periodicity. Conversely, the second target 106b (L4) with four-fold periodicity does not couple into the first pickup coil pair 115 (L cos 3, L sin 3) with three-fold periodicity. As a result, it is particularly simply possible for different signal strengths to be ascertained in the different pickup coil pairs 115, 126 (L cos 3, L sin 3 and L cos 4, L sin 4), from which again the spatial clearance 107 between the rotor 102 and the stator 101 can be ascertained.

It can be favorable here if at least the two pickup coil pairs 115, 125 (L3 cos, L3 sin, L4 cos, L4 sin), and optionally also one or both targets 106a, 106 (L3, L4), are astatic. Astatic refers to coils or targets when homogeneous, temporally variable magnetic fields do not induce any signals in them. For further details regarding astatic implementations, reference is made to the German application with the official file reference 102019213174.3x, whose content is incorporated through reference.

The first and second pickup coils 115a, 115b of the first pickup coil pair 115 can be rotated with respect to one another, so that a first pickup coil signal $S_{i\_PS1}$ induced in the first pickup coil 115a is essentially orthogonal to a second pickup coil signal $S_{i\_PS2}$ induced in the second pickup coil 115b, for example according to $S_{i\_PS1}=S_i \cos$ and $S_{i\_PS2}=S_i \sin$. The first pickup coil signal $S_{i\_PS1}$ induced in the first pickup coil 115a can thus for example have a cosinusoidal waveform, and is therefore also identified as c3 in FIG. 6A. The second pickup coil signal $S_{i\_PS2}$ induced in the second pickup coil 115b can for example have a sinusoidal waveform, and is therefore also identified as s3 in FIG. 6A.

A combination of the first and second pickup coil signals $S_{i\_PS1}$ and $S_{i\_PS2}$ induced in the two individual coils 115a, 115b of the first pickup coil pair 115 can, as described further above, supply the first coil pair induction strength signal $S_{i\_first}$, which represents the signal strength of the two pickup coil signals $S_{i\_PS1}$ and $S_{i\_PS2}$ induced in the first pickup coil pair 115. As long as the two pickup coil signals $S_{i\_PS1}$ and $S_{i\_PS2}$ are orthogonal signals, the first coil pair induction strength signal $S_{i\_first}$ can for example be calculated from the two pickup coil signals $S_{i\_PS1}$ and $S_{i\_PS2}$ according to:

$$S_{i\_first}=\sqrt{S_{i\_PS1}^2+S_{i\_PS2}^2} \text{ or } S_{i\_first}=\sqrt{c3^2+s3^2}. \qquad [4]$$

The same can apply analogously to the second pickup coil pair 125, which can comprise a third pickup coil 125a and a fourth pickup coil 125b. The third and fourth pickup coils 125a, 125b of the second pickup coil pair 125 can be rotated with respect to one another, so that a third pickup coil signal $S_{i\_PS3}$ induced in the third pickup coil 125a is essentially orthogonal to a fourth pickup coil signal $S_{i\_PS4}$ induced in the fourth pickup coil 125b. The third pickup coil signal $S_{i\_PS3}$ induced in the third pickup coil 125a can for example have a cosinusoidal waveform, and is therefore also identified as c4 in FIG. 6A. The fourth pickup coil signal $S_{i\_PS4}$ induced in the fourth pickup coil 125b can for example have a sinusoidal waveform, and is therefore also identified as s4 in FIG. 6A.

A combination of the third and fourth pickup coil signals $S_{i\_PS3}$ and $S_{i\_PS4}$ induced in the two individual coils 125a, 125b of the second pickup coil pair 125 can, as described further above, supply the second coil pair induction strength signal $S_{i\_second}$, which represents the signal strength of the two pickup coil signals $S_{i\_PS3}$ and $S_{i\_PS4}$ induced in the second pickup coil pair 125. As long as the two pickup coil signals $S_{i\_PS3}$ and $S_{i\_PS4}$ are orthogonal signals, the second coil pair induction strength signal $S_{i\_second}$ can for example be calculated from the two pickup coil signals $S_{i\_PS3}$ and $S_{i\_PS4}$ according to:

$$S_{i\_second}=\sqrt{S_{i\_PS3}^2+S_{i\_PS4}^2} \text{ or } S_{i\_second}=\sqrt{c4^2+s4^2}. \qquad [5]$$

Since the entire pickup coil arrangement 105 in this non-restrictive example implementation can comprise the two pickup coil pairs 115, 125 described above, the induction strength signal $S_i$ can accordingly be formed from a suitable combination of the first coil pair induction strength signal $S_{i\_first}$ and of the second coil pair induction strength signal $S_{i\_second}$. This means that the first coil pair induction strength signal $S_{i\_first}$ represents the induction strength in the first pickup coil pair 115, that the second coil pair induction strength signal $S_{i\_second}$ represents the induction strength in the second pickup coil pair 125, and that the induction strength signal $S_i$ represents the induction strength of the entire pickup coil arrangement 105.

The circuit 108 of the example implementation of an inductive angle sensor 100 illustrated in FIG. 6A can now for example be designed to ascertain a ratio between the two coil pair induction strength signals $S_{i\_first}$ and $S_{i\_second}$ referred to above of the first and second pickup coil pair 115, 125, for example in the form $S_{i\_first}/S_{i\_second}$. This ratio $S_{i\_first}/S_{i\_second}$ depends monotonically on the spatial clearance 107 between the rotor 102 and the stator 101, and is a measure for this spatial clearance 107 ('AG') between the rotor 102 and the stator 101, for example:

$$S_{i\_first}/S_{i\_second} \sim 1 \sim 1/AG.$$

The spatial clearance 107 between the rotor 102 and the stator 101 can thus be determined on the basis of the two coil pair induction strength signals $S_{i\_first}$ and $S_{i\_second}$ of the respective pickup coil pair 115, 125 or on the basis of the induction strength signal $S_i$ induced in the pickup coil arrangement 105.

One advantage here is that the ascertainment of the spatial clearance 107 by forming the ratio between the two coil pair induction strength signals $S_{i\_first}$ and $S_{i\_second}$ of the first and second pickup coil pair 115, 125 can be independent of the electric current $I_1$ that flows through the excitation oscillating circuit 103 or through the excitation coil 104. A further advantage can be the independency of the carrier frequency.

The first pickup coil pair 115 can furthermore have an n-fold symmetry, and the second pickup coil pair 125 can have an m-fold symmetry, for example with m=n+x, where m, n and x are each integral variables.

The target arrangement 106 arranged in or at the rotor 102 can comprise a first inductive target 106a and a second inductive target 106b. The first inductive target 106a can have an n-fold symmetry, and the second inductive target 106b can have an m-fold symmetry, for example with m=n+x, where m, n and x are each integral variables.

The first inductive target 106a with the n-fold symmetry can thus be designed to transmit signals with the first pickup coil pair 115, which can also have an n-fold symmetry. The second inductive target 106b with the m-fold symmetry on the other hand can be designed to transmit signals with the second pickup coil pair 125, which can also have an m-fold symmetry. Interference between the first and second pickup coil pairs 115, 125 can thus be reduced or suppressed. For more details in this respect, reference is also again made at this point to the German application with the official file reference 102019213174.3, whose content is incorporated through reference.

Figure 6B:
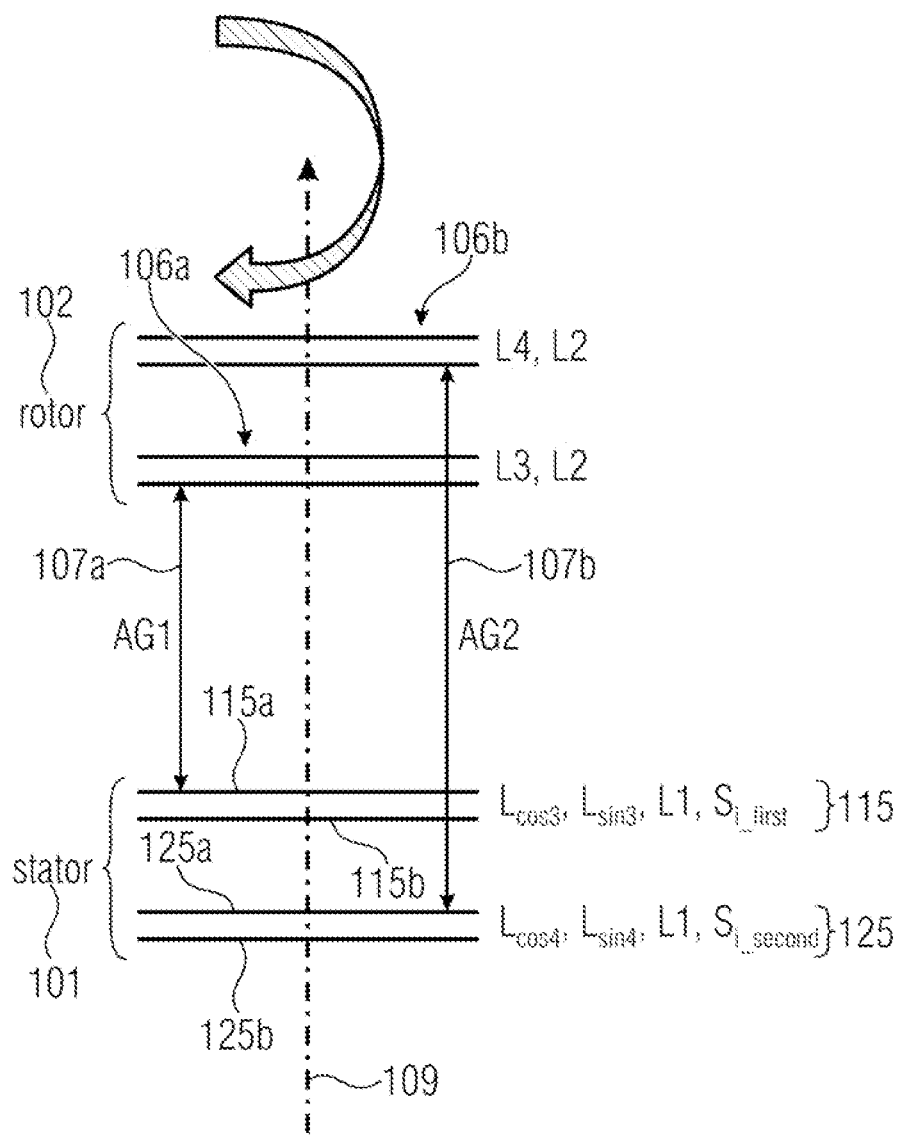
FIG. 6B shows a schematic side view of a stator with two pickup coil pairs and a rotor with two inductive targets according to one example implementation.

As can be seen in FIG. 6B, the two pickup coil pairs 115, 125 arranged in or at the stator 101, and the two associated inductive targets 106a, 106b arranged in or at the rotor 102 can be arranged along the common axis of rotation 109 in such a way that the first pickup coil pair 115 has a first spatial clearance 107a 'AG1' from the corresponding first inductive target 106a, and in such a way that the second pickup coil pair 125 has a second spatial clearance 107b 'AG2' from the corresponding second inductive target 106b.

The first spatial clearance 107a can for example be smaller than the second spatial clearance 107b. As explained further above, the coil pair induction strength signal $S_{i\_first}$ or $S_{i\_second}$ belonging to the respective pickup coil pair 115, 125 can depend inter alia on the spatial clearance 107 of the rotor 102 relative to the stator 101. Accordingly, in the case referred to here purely by way of example, the amplitude of the first coil pair induction strength signal $S_{i\_first}$ belonging to the first pickup coil pair 115 could thus be larger than the amplitude of the second coil pair induction strength signal $S_{i\_second}$ belonging to the second pickup coil pair 125 due to the smaller clearance 107a.

According to one conceivable example implementation, the inductive angle sensor 100 can be designed in such a way that the two coil pair induction strength signals $S_{i\_first}$ and $S_{i\_second}$ have a significantly measurable difference in terms of their respective amplitude if the difference is too small, this leads by way of noise and other real error terms in practice to an inaccurate estimate of the spatial clearance 107 between rotor 102 and stator 101. On the other hand, the amplitudes of the two coil pair induction strength signals $S_{i\_first}$ and $S_{i\_second}$ should not deviate from each other too much, since this can then lead to noise problems for the weaker signal. A trade-off thus needs to be found which in practice can lie at signal strength ratios between 1.1 and 3 (e.g. between 1.5 and 2).

The clearance between the two pickup coil pairs 115, 125 arranged in or at the stator 101 can always be known here, since they can for example be assembled with a predefined clearance from one another. The clearance between the two inductive targets 106a, 106b arranged in or at the rotor 102 can also always be known. Therefore, the remaining variable is the spatial clearance 107 between the rotor 102 and the stator 101, wherein this variable, as described before, can be determined for example on the basis of the ratio between the two coil pair induction strength signals $S_{i\_first}$ and $S_{i\_second}$ of the respective pickup coil pair 115, 125.

Figure 7:
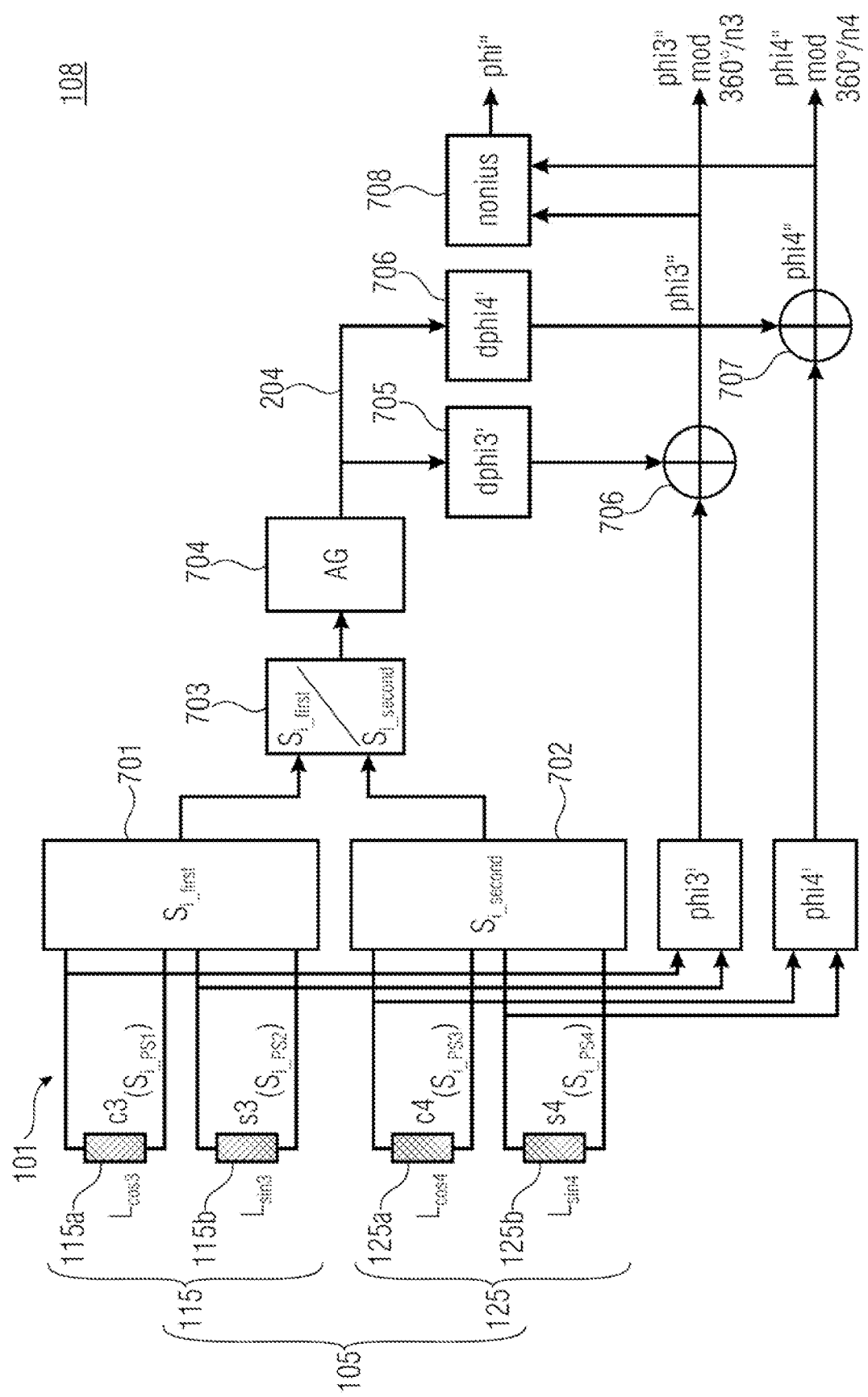
FIG. 7 shows a schematic view of a stator and a circuit of an inductive angle sensor according to one example implementation.

FIG. 7 shows a further example implementation of a circuit 108 for an inductive angle sensor 100 according to the innovative concept described herein. With this construction, a highly accurate angle sensor 100 can be provided, whose accuracy when ascertaining the true rotation angle φ between the rotor 102 and the stator 101 is significantly increased in comparison with conventional angle sensors. This example implementation can use what is known as the Nonius principle for this purpose, which is to be explained in more detail below with reference to FIG. 7.

Similarly to the example implementation shown in FIG. 6A, the stator 101 first also comprises here a pickup coil arrangement 105 with a plurality of pickup coils 115a, 115b, 125a, 125b and correspondingly a plurality of inductive targets (not illustrated). The pickup coil arrangement 105 comprises a first pickup coil pair 115 and a second pickup coil pair 125. The first pickup coil pair 115 comprises a first pickup coil 115a and a second pickup coil 115b. The second pickup coil pair 125 comprises a third pickup coil 125a and a fourth pickup coil 125b. The pickup coils 115a, 115b of the first pickup coil pair 115 can have an n-fold symmetry with e.g. n=3, and the pickup coils 125a, 125b of the second pickup coil pair 125 can have an m-fold symmetry, with e.g. m=4.

The first pickup coil signal $S_{i\_PS1}$ is induced in the first pickup coil 115a, the second pickup coil signal $S_{i\_PS2}$ is induced in the second pickup coil 115b, the third pickup coil signal $S_{i\_PS3}$ is induced in the third pickup coil 125a, and the fourth pickup coil signal $S_{i\_PS4}$ is induced in the fourth pickup coil 125b.

A first signal processing unit 701 of the circuit 108 can be designed to combine the first and second pickup coil signals $S_{i\_PS1}$ and $S_{i\_PS2}$ and to generate the first coil pair induction strength signal $S_{i\_first}$ of the first pickup coil pair 115 from them. A further signal processing unit 702 of the circuit 108 can be designed to combine the third and fourth pickup coil signals $S_{i\_PS3}$ and $S_{i\_PS4}$ and to generate the second coil pair induction strength signal $S_{i\_second}$ of the second pickup coil pair 125 from them.

A further signal processing unit 703 of the circuit 108 can be designed to ascertain a ratio between the two coil pair induction strength signals $S_{i\_first}$ and $S_{i\_second}$. Since, as explained further above, the ratio of the two coil pair induction strength signals $S_{i\_first}$ and $S_{i\_second}$ depends monotonically on the spatial clearance 107 (or air gap—'AG') between the rotor 102 and the stator 101, this spatial clearance 107 ('AG') can even be ascertained in a further signal processing unit 704 from the ratio $S_{i\_first}/S_{i\_second}$.

The ascertained spatial clearance 107 between the rotor 102 and the stator 101 can be further processed in the form of a corresponding clearance signal 204, and used in a further signal processing unit 705 in order to ascertain a first angle correction value dphi3' for the first pickup coil pair 115 on that basis. The ascertained spatial clearance 107, or the clearance signal 204, can further be used in a further signal processing unit 708 to ascertain a second angle correction value dphi4' for the second pickup coil pair 125 on that basis.

A first combiner 706 can be designed to combine the first angle correction value dphi3' with a first uncalibrated angle value phi3' of the first pickup coil pair 115 that has been ascertained without giving consideration to the spatial clearance 107 between the rotor 102 and the stator 101. According to the innovative concept described herein a first calibrated rotation angle value phi3" for the first pickup coil pair 115 results from this. Because this first calibrated rotation angle value phi3" only applies to the first pickup coil pair 115, but not to the entire pickup coil arrangement 105, the first calibrated rotation angle value phi3" can also be referred to as a first intermediate calibrated rotation angle value phi3".

A second combiner 707 can be designed to combine the second angle correction value dphi4' with a second uncalibrated angle value phi4' of the second pickup coil pair 125 that has again been ascertained without giving consideration to the spatial clearance 107 between the rotor 102 and the stator 101. According to the innovative concept described herein a second calibrated rotation angle value phi4" for the second pickup coil pair 125 results from this. Because this second calibrated rotation angle value phi4" only applies to the second pickup coil pair 125, but not to the entire pickup coil arrangement 105, the second calibrated rotation angle value phi4" can also be referred to as a second intermediate calibrated rotation angle value phi4".

A further signal processing unit 708 can be designed to combine the first intermediate calibrated rotation angle value phi3" and the second intermediate calibrated rotation angle value phi4" with one another and to generate a calibrated rotation angle value phi". The calibrated rotation angle value phi" can thus apply to the entire pickup coil arrangement 105. The combination of the two intermediate calibrated rotation angle values phi3" and phi4" can supply a more precise result in comparison to an implementation in which the two intermediate calibrated rotation angle values phi3" and phi4" are not combined with one another.

The signal processing unit 708 can for example combine the two intermediate calibrated rotation angle values phi3" and phi4" with one another in accordance with the Nonius principle. According to the Nonius principle, one of the two intermediate calibrated rotation angle values phi3" and phi4" can be used as a first, coarse measure for the true rotation angle φ between the rotor 102 and the stator 101, and the respectively other one of the two intermediate calibrated rotation angle values phi3" and phi4" can be used as a finer subdivision of the measure. This Nonius principle is known inter alia from vernier calipers. For further details regarding the Nonius principle for an inductive angle sensor 100, reference is again made at this point to the German patent application with the official file reference 102019213174.3, whose content is hereby incorporated through reference.

Figure 8:
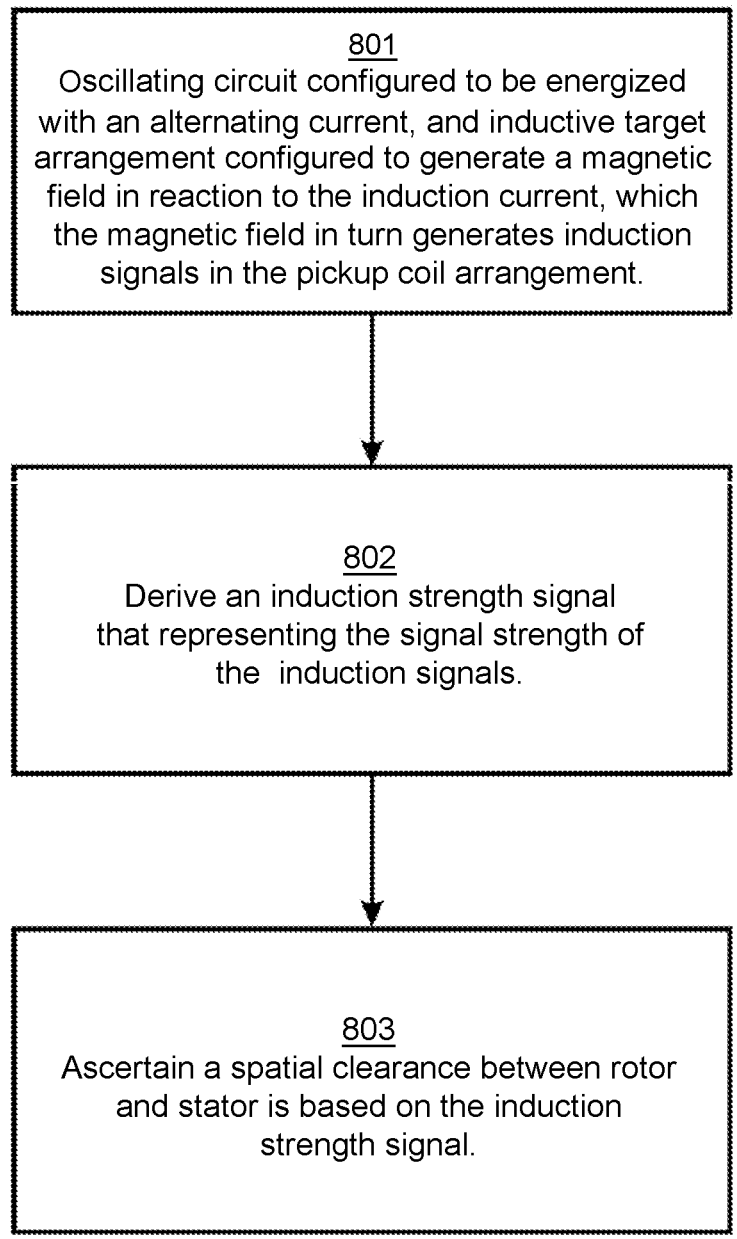
FIG. 8 shows a block diagram of a method according to one example implementation.

FIG. 8 shows a schematic block diagram of a method 800 for determining the rotation angle φ between the stator 101 and the rotor 102 according to the concept described herein. To carry out the method 800, the stator 101 comprises the previously described excitation oscillating circuit 103 or the excitation coil 104 as well as the pickup coil arrangement 105, and the rotor 102 comprises the previously described inductive target arrangement 106.

In step 801 the excitation oscillating circuit 103 is energized with an alternating current, so that an induction current is induced in the target arrangement 106, and the target arrangement 106 generates a magnetic field 116 in reaction to the induction current, which magnetic field in turn generates induction signals $S_{i\_PS1}$, $S_{i\_PS2}$ in the pickup coil arrangement 105.

In step 802 the induction strength signal $S_i$, that represents the signal strength of the induction signals $S_{i\_PS1}$, $S_{i\_PS2}$, as described further above, is ascertained.

In step 803 the spatial clearance 107 between the rotor 102 and the stator 101 is ascertained on the basis of the induction strength signal $S_i$.

It can thus be the in summary that the concept described herein relates inter alia to a method 800 and to a corresponding inductive angle sensor 100, wherein the spatial clearance 107 between the stator 101 and the rotor 102 is ascertained on the basis of an induction strength signal $S_i$. This ascertained spatial clearance 107 can be used for further signal processing, for example for a determination of the rotation angle φ between the stator 101 and the rotor 102.

The inductive angle sensor 100 can for example comprise an excitation coil 104, pickup coils 115a, 115b, 125a, 125b and inductive targets 106a, 106b. The inductive angle sensor 100 can, furthermore, comprise means that are designed to ascertain a signal strength of at least one coil pair signal $S_{i\_PS1}$, $S_{i\_PS2}$ that is induced in a pickup coil pair 115 (e.g. sine and cosine coils). This signal strength can be represented by an induction strength signal $S_i$ or $S_{i\_first}$ (e.g. $S_i = S_{i\_first}$) which can be determined from a suitable combination of the individual coil pair signals $S_{i\_PS1}$, $S_{i\_PS2}$. The inductive angle sensor 100 can, moreover, comprise means that are designed to establish a relationship between this signal strength $S_i$ and the signal strength of an electric current h that is flowing through the excitation coil 104. Alternatively or in addition, the inductive angle sensor 100 can comprise means that are designed to establish a relationship between this signal strength $S_i = S_{i\_first}$ and the signal strength $S_{i\_second}$ of a second pickup coil pair 125. The inductive angle sensor 100 can, furthermore, comprise a circuit 108 that is designed to ascertain, for example to estimate, the spatial clearance 107 between the rotor 102 and the stator 101 and to generate a corresponding clearance signal 204. The circuit 108 can furthermore be designed to determine an angle correction value dphi' on the basis of the clearance signal 204. The circuit 108 can, furthermore, comprise a combiner 205 that is designed to combine a coarse angle value phi of the pickup coil pair 115, which has been ascertained without giving consideration to the spatial clearance 107, with the angle correction value dphi', and so to obtain a calibrated rotation angle signal phi". This can also be referred to as an autocalibration method for an inductive angle sensor 100.

The example implementations described above only represent a clarification of the principles of the concept described herein. It is obvious that modifications and variations of the arrangements and details described herein will be clear to other specialists. It is therefore intended that the concept described herein is only restricted by the scope of protection of the following patent claims, and not by the specific details that have been presented herein with reference to the description and the explanation of the example implementations.

Although some aspects have been described in connection with a device, it is clear that these aspects also represent a description of the corresponding method, so that a block or a component of a device is also to be understood as a corresponding method step or as a feature of a method step. Aspects that have been described in connection with a method step or as a method step analogously also represent a description of a corresponding block or detail or feature of a corresponding device.

Some or all of the method steps can be carried out by a hardware apparatus (or making use of a hardware apparatus), such as for example a microprocessor, a programmable computer or an electronic circuit. In some example implementations, some or a plurality of the most important method steps can be carried out by such an apparatus.

Depending on specific implementation requirements, example implementations of the concept described herein can be implemented in hardware or in software or at least partially in hardware or at least partially in software. The implementation can be carried out making use of a digital storage medium, for example a floppy disk, a DVD, a Blu-ray disc, a CD, a ROM, a PROM, an EPROM, an EEPROM or a FLASH memory, a hard disk or another magnetic or optical store on which electronically readable control signals are stored that can or do interact with a programmable computer system in such a way that the respective method is carried out. The digital storage medium can therefore be computer-readable.

Some example implementations according to the concept described herein thus comprise a data carrier that comprises electronically readable control signals that are capable of interacting with a programmable computer system in such a way that one of the methods described herein is carried out.

Example implementations of the concept described herein can in general be implemented as a computer program product with a program code, wherein the program code is accordingly effective in carrying out one of the methods when the computer program product is executed on a computer.

The program code can for example also be stored on a machine-readable carrier.

Other example implementations comprise the computer program for carrying out one of the methods described herein, wherein the computer program is stored on a machine-readable carrier. In other words, an example implementation of the method described herein is thus a computer program that comprises a program code for carrying out one of the methods described herein when the computer program is executed on a computer.

A further example implementation of the method described herein is thus a data carrier (or a digital storage medium or a computer-readable medium) on which the computer program for carrying out one of the methods described herein is recorded. The data carrier or the digital storage medium or the computer-readable medium are typically tangible and/or not volatile.

A further example implementation of the method described herein is thus a data stream or a sequence of signals that represents or represent the computer program for carrying out one of the methods described herein. The data stream or the sequence of signals can for example be accordingly configured to be transferred over a data communication connection, for example over the Internet.

A further example implementation comprises a processing device, for example a computer or a programmable logic component, that is accordingly configured or adapted to carry out one of the methods described herein.

A further example implementation comprises a computer on which the computer program for carrying out one of the methods described herein is installed.

A further example implementation according to the concept described herein comprises a device or a system that is designed to transmit a computer program for carrying out at least one of the methods described herein to a receiver. The transmission can for example take place electronically or optically. The receiver can for example be a computer, a mobile device, a storage device or a similar device. The device or the system can for example comprise a file server for transmitting the computer program to the receiver.

In some example implementations, a programmable logic component (for example a field programmable gate array, an FPGA), can be used to carry out some or all of the functionalities of the methods described herein. In some example implementations, a field programmable gate array can interact with a microprocessor in order to carry out one of the methods described herein. In general, in some example implementations, the methods are carried out by an arbitrary hardware device. This can be universally usable hardware such as a computer processor (CPU) or hardware specific for the method, such as for example an ASIC.

The invention claimed is:

1. An inductive angle sensor comprising:
   a stator with an excitation oscillating circuit and a pickup coil arrangement,
   a rotor which is arranged rotatably with respect to the stator and comprises an inductive target arrangement,
      wherein the excitation oscillating circuit is configured to be energized with an alternating current, in order to induce an induction current in the inductive target arrangement, and
      wherein the inductive target arrangement is configured to generate a magnetic field in reaction to the induction current, which the magnetic field in turn induces induction signals in the pickup coil arrangement,
   wherein the inductive angle sensor further comprises a circuit configured to:
      derive an induction strength signal representing a signal strength of the induction signals from the induction signals,
         wherein the induction signals are induced in the pickup coil arrangement, and
      ascertain a spatial clearance between the rotor and the stator based on the induction strength signal, and generate a clearance signal based on the ascertained spatial clearance.

2. The inductive angle sensor as claimed in claim 1, wherein the circuit is configured to ascertain a ratio between the induction strength signal and a current magnitude in the excitation oscillating circuit, and to ascertain the spatial clearance between the rotor and the stator based on the ratio and to output the spatial clearance as a corresponding clearance signal.

3. The inductive angle sensor as claimed in claim 1, wherein the circuit is configured to ascertain a calibrated rotation angle signal that represents a rotation angle between the stator and the rotor, wherein the calibrated rotation angle signal is ascertained based on the induction strength signal and giving consideration to the clearance signal representing the spatial clearance between the rotor and the stator.

4. The inductive angle sensor as claimed in claim 3, wherein an amplitude of the induction strength signal varies depending on a position of the rotor relative to the stator, and wherein the circuit is configured to determine a position-corrected induction strength signal, and wherein the circuit is further configured to determine the calibrated rotation angle signal based on the position-corrected induction strength signal.

5. The inductive angle sensor as claimed in claim 3, wherein an amplitude of the induction strength signal varies depending on a current magnitude in the excitation oscillating circuit, and wherein the circuit is configured to determine a corresponding current magnitude-corrected induction strength signal, and wherein the circuit is further configured to determine the calibrated rotation angle signal based on the current magnitude-corrected induction strength signal.

6. The inductive angle sensor as claimed in claim 3, wherein the circuit is further configured to determine an angle correction value based on the clearance signal, and to give the angle correction value consideration in the determination of the calibrated rotation angle signal.

7. The inductive angle sensor as claimed in claim 6, wherein the circuit is configured to determine an uncalibrated angle value that is ascertained independently of the spatial clearance between the rotor and the stator, and wherein the circuit is further configured to combine the uncalibrated angle value with the angle correction value, in order to ascertain the calibrated rotation angle signal.

8. The inductive angle sensor as claimed in claim 1, wherein the pickup coil arrangement comprises a first pickup coil pair with a first pickup coil and a second pickup coil and also a second pickup coil pair with a third pickup coil and a fourth pickup coil, wherein the inductive target arrangement comprises a first inductive target and a second inductive target, wherein the first pickup coil pair has a first spatial clearance from the first inductive target, and wherein the second pickup coil pair has a second spatial clearance from the second inductive target that is different from the first spatial clearance, wherein the first pickup coil pair generates a first pickup coil pair signal, from which a first coil pair induction strength signal can be derived, and wherein the second pickup coil pair generates a second pickup coil pair signal, from which a second coil pair induction strength signal can be derived, and wherein the circuit is configured to ascertain a ratio between the first coil pair induction strength signal and the second coil pair induction strength signal and to determine the spatial clearance between the rotor and the stator based on the ratio.

9. The inductive angle sensor as claimed in claim 8, wherein the first pickup coil is arranged with an offset to the second pickup coil, so that a first pickup coil signal induced in the first pickup coil is offset in phase by 90° with respect to a second pickup coil signal induced in the second pickup coil, and wherein the first coil pair induction strength signal comprises a combination of the first and second pickup coil signals.

10. The inductive angle sensor as claimed in claim 8, wherein the third pickup coil is arranged with an offset to the fourth pickup coil, so that a third pickup coil signal induced in the third pickup coil is offset in phase by 90° with respect to a fourth pickup coil signal induced in the fourth pickup coil, and wherein the second coil pair induction strength signal comprises a combination of the third and fourth pickup coil signals.

11. The inductive angle sensor as claimed in claim 8, wherein the first pickup coil pair has an n-fold symmetry and the second pickup coil pair has an m-fold symmetry, with m=n+x, where m, n and x are each integer variables, and wherein the first inductive target has an n-fold symmetry and the second inductive target has an m-fold symmetry, with m=n+x, where m, n and x are each integer variables.

12. The inductive angle sensor as claimed in claim 8, wherein the circuit is configured to generate a clearance signal representing the spatial clearance between the rotor and the stator, and to determine, based on the clearance signal, a first angle correction value for the first pickup coil pair and a second angle correction value for the second pickup coil pair, and to take the first and second angle correction values into consideration when ascertaining a calibrated rotation angle signal, wherein the circuit is further configured to determine a first uncalibrated angle value for the first pickup coil pair and a second uncalibrated angle value for the second pickup coil pair, wherein the uncalibrated angle values are each ascertained independently of the spatial clearance between the rotor and the stator, and wherein the circuit is further configured to combine the first uncalibrated angle value with the first angle correction value and to combine the second uncalibrated angle value with the second angle correction value in order to ascertain the calibrated rotation angle signal.

13. The inductive angle sensor as claimed in claim 12, wherein the circuit is configured to obtain a first intermediate calibrated rotation angle value when combining the first uncalibrated angle value with the first angle correction value, and to obtain a second intermediate calibrated rotation angle value when combining the second uncalibrated angle value with the second angle correction value, and wherein the circuit is further configured to determine the calibrated rotation angle signal based on a combination of the first intermediate calibrated rotation angle value and the second intermediate calibrated rotation angle value.

14. A method for operating an inductive angle sensor with a stator and a rotor that is movable with respect to the stator, wherein the stator comprises an excitation oscillating circuit and a pickup coil arrangement, and wherein the rotor comprises an inductive target arrangement, wherein the method comprises:

energizing the excitation oscillating circuit with an alternating current, so that an induction current is induced in the inductive target arrangement, and the inductive target arrangement generates a magnetic field in reaction to the induction current, which the magnetic field in turn induces induction signals in the pickup coil arrangement, ascertaining an induction strength signal representing a signal strength of the induction signals, wherein the induction signals are induced in the pickup coil arrangement, and ascertaining a spatial clearance between the rotor and the stator based on the induction strength signal.

15. A computer program with a program code for carrying out the method as claimed in claim 14, when the computer program is executed on a computer.

* * * * *